United States Patent
Eydelman et al.

(10) Patent No.: US 6,978,312 B2
(45) Date of Patent: Dec. 20, 2005

(54) ADAPTIVE FLOW CONTROL PROTOCOL

(75) Inventors: Vadim Eydelman, Redmond, WA (US); Khawar M. Zuberi, Bellevue, WA (US)

(73) Assignee: Microsoft Corporation, Redmond, WA (US)

(*) Notice: Subject to any disclaimer, the term of this patent is extended or adjusted under 35 U.S.C. 154(b) by 877 days.

(21) Appl. No.: 09/844,098

(22) Filed: Apr. 27, 2001

(65) Prior Publication Data

US 2002/0007420 A1    Jan. 17, 2002

Related U.S. Application Data

(63) Continuation-in-part of application No. 09/453,781, filed on Dec. 3, 1999.

(60) Provisional application No. 60/159,316, filed on Oct. 14, 1999, provisional application No. 60/112,777, filed on Dec. 18, 1998.

(51) Int. Cl.$^7$ .......................................... G06F 15/16
(52) U.S. Cl. ................ 709/235; 709/232; 709/234; 370/231; 370/235
(58) Field of Search ..................... 709/224, 223, 709/227, 232–235; 370/229, 231, 235

(56) References Cited

U.S. PATENT DOCUMENTS

| | | | | |
|---|---|---|---|---|
| 4,616,359 A | * | 10/1986 | Fontenot | 370/230 |
| 5,315,587 A | * | 5/1994 | Kullander | 370/235 |
| 5,473,679 A | | 12/1995 | La Porta et al. | |
| 5,748,900 A | * | 5/1998 | Scott et al. | 709/235 |
| 5,771,356 A | * | 6/1998 | Leger et al. | 709/234 |
| 5,892,754 A | * | 4/1999 | Kompella et al. | 370/236 |
| 6,034,945 A | * | 3/2000 | Hughes et al. | 370/230 |
| 6,081,851 A | * | 6/2000 | Futral et al. | 709/212 |
| 6,108,701 A | | 8/2000 | Davies et al. | |
| 6,141,692 A | * | 10/2000 | Loewenstein et al. | 709/234 |
| 6,157,634 A | | 12/2000 | Mehta et al. | |

FOREIGN PATENT DOCUMENTS

WO    WO 97/31459    *    8/1997

OTHER PUBLICATIONS

S.J. Ryan et al., "SCI for Local Area Networks", ISBN 82-7368-180-7.
"Virtual Interface Architecture Specification", Dec. 4, 1997, available from www.viarch.org.
Buzzard et al., An Implementation of the Hamlyn Sender-Managed Interface Architecture; 15 pages; Published in "The Second Symposium on Operating Systems Design and Implementation (OSDI'96) Proceedings" (Seattle, WA) Oct. 28-31, 1996.
Buzzard et al., Hamlyn: a high-performance network interface with sender-based memory management; 11 pages; HP Laboratories Technical Report; © Hewlett-Packard Company, 1995.
Wilkes; Hamlyn—an interface for sender-based communications; 17 pages; © Hewlett-Packard Company, 1992.

* cited by examiner

*Primary Examiner*—Philip B. Tran
(74) *Attorney, Agent, or Firm*—Microsoft Corporation

(57) ABSTRACT

A method and system for directing data transfers between applications and devices residing on different computers or devices using an adaptive flow control protocol has been described. When an application or device requests to transfer data with another application or device, the adaptive flow control protocol adapts the way data is transferred by observing when an application that is receiving data posts a receive buffer and detects the receive buffer's size. Based upon the application's or device's behavior, the adaptive flow control protocol transfers the data in a mode that is best suited for the application. A credit-based sequencing method is used to coordinate message transfers.

10 Claims, 6 Drawing Sheets

ADAPTIVE FLOW CONTROL PROTOCOL

RELATED APPLICATIONS

This application is a continuation-in-part of U.S. application Ser. No. 09/453,781, filed Dec. 3, 1999, which claims the benefit of U.S. Provisional Application No. 60/112,777, filed Dec. 18, 1998 and U.S. Provisional Application No. 60/159,316, filed Oct. 14, 1999.

TECHNICAL FIELD

This invention relates generally to networked communications and, more particularly, relates to a flow control protocol for use with transport providers.

BACKGROUND OF THE INVENTION

Computer networking allows applications residing on separate computers or devices to communicate with each other by passing data across the network connecting the computers. Traditional network media, such as Ethernet and ATM, are not reliable for application-to-application communication and provide only machine-to-machine datagram delivery service. In order to provide reliable application-to-application communication, transport protocol software run on the host machine must provide the missing functionality.

Typically, the protocol software for network communication is implemented as a combination of a kernel-mode driver and a user-mode library. All application communication passes through these components. As a result, application communication consumes a significant amount of the host processor's resources and incurs additional latency. Both of these effects degrade application communication performance. This degradation significantly limits the overall performance of communication intensive applications, such as distributed databases.

Recently, a new class of communication interconnects called System Area Networks (SANs) has emerged to address the performance requirements of communication intensive distributed applications. SANs provide very high bandwidth communication, multi-gigabytes per second, with very low latency. SANs differ from existing media, such as Gigabit Ethernet and ATM, because they implement reliable transport functionality directly in hardware. Each SAN network interface controller (NIC) exposes individual transport endpoint contexts and demultiplexes incoming packets accordingly. Each endpoint is usually represented by a set of memory-based queues and registers that are shared by the host processor and the NIC. Many SAN NICs permit these endpoint resources to be mapped directly into the address space of a user-mode process. This allows application processes to post messaging requests directly to the hardware. This design consumes very little of the host processor's resources and adds little latency to communication. As a result, SANs can deliver extremely good communication performance to applications.

In general, SAN hardware does not perform any buffering or flow control. Most distributed applications are designed to communicate using a specific transport protocol and a specific application programming interface (API). A large number of existing distributed applications are designed to utilize the Transmission Control Protocol/Internet Protocol (TCP/IP) suite and some variant of the Berkeley Sockets API, such as Windows Sockets. Since existing applications are usually designed to use one primary transport protocol and API—most often TCP/IP and Sockets—there have been relatively few applications that can take advantage of the performance offered by SANs. In order for existing applications to use a SAN, the TCP/IP protocol software must currently be run on top of it, eliminating the performance benefits of this media.

In order to emulate the data transfer behavior of the primary transport provider when utilizing an alternative transport provider such as a SAN without running TCP/IP protocol software on top of it, a protocol must be implemented that controls the transfer of data from source memory buffers supplied by a first application into destination memory buffers supplied by a second application. This aspect of data transfer is known as flow control. The TCP/IP protocol provides for data transfer in the form of an unstructured stream of bytes. It is the responsibility of the applications using the TCP/IP protocol to encode the data stream to mark the boundaries of messages, records, or other structures. The Berkeley Sockets and Windows Sockets communication APIs offer applications a great deal of flexibility for receiving data. Applications may request to receive data directly into a specified memory buffer, request to receive a copy of a prefix of the data directly into a specified buffer without removing the original data from the byte stream (peek), or request to be notified when data is available to be received and only then request to receive the data or peek at it. Since TCP/IP provides an unstructured byte stream, an application may request to receive data from the stream into a specified memory buffer in any size portion, e.g. a single byte or thousands of bytes. The flexibility of these communication APIs and the unstructured nature of the TCP/IP data stream make it difficult to implement a flow control protocol that works efficiently for all applications. What is needed is a flow control protocol that emulates many of the features of TCP/IP and that allows applications to take advantage of the performance benefits of alternative transport providers.

SUMMARY OF THE INVENTION

The present invention provides an adaptive flow control protocol to enable applications designed for a primary transport provider to use one of a plurality of alternative transport providers that offer some benefit over the primary transport provider, such as higher performance. When using an alternative transport provider, the adaptive flow control protocol adjusts its data transfer strategy based on the behavior of the communicating applications. The adaptive flow control protocol monitors the receiving application to determine when the receiving application posts buffers to receive the data and also detects the size of the buffers and then changes the way it directs data to be transferred between the applications based on when buffers were posted and buffer size. Large data blocks are transferred using remote direct memory access transfers if the receiving application's receiving buffers are of sufficient size or through messages if the receiving buffers are not large enough. Through this adaptive mechanism, the adaptive flow control protocol attempts to maximize the communication bandwidth and minimize the communication latency observed by the communicating applications.

Additional features and advantages of the invention will be made apparent from the following detailed description of illustrative embodiments that proceeds with reference to the accompanying figures.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION OF THE INVENTION

Figure 1:
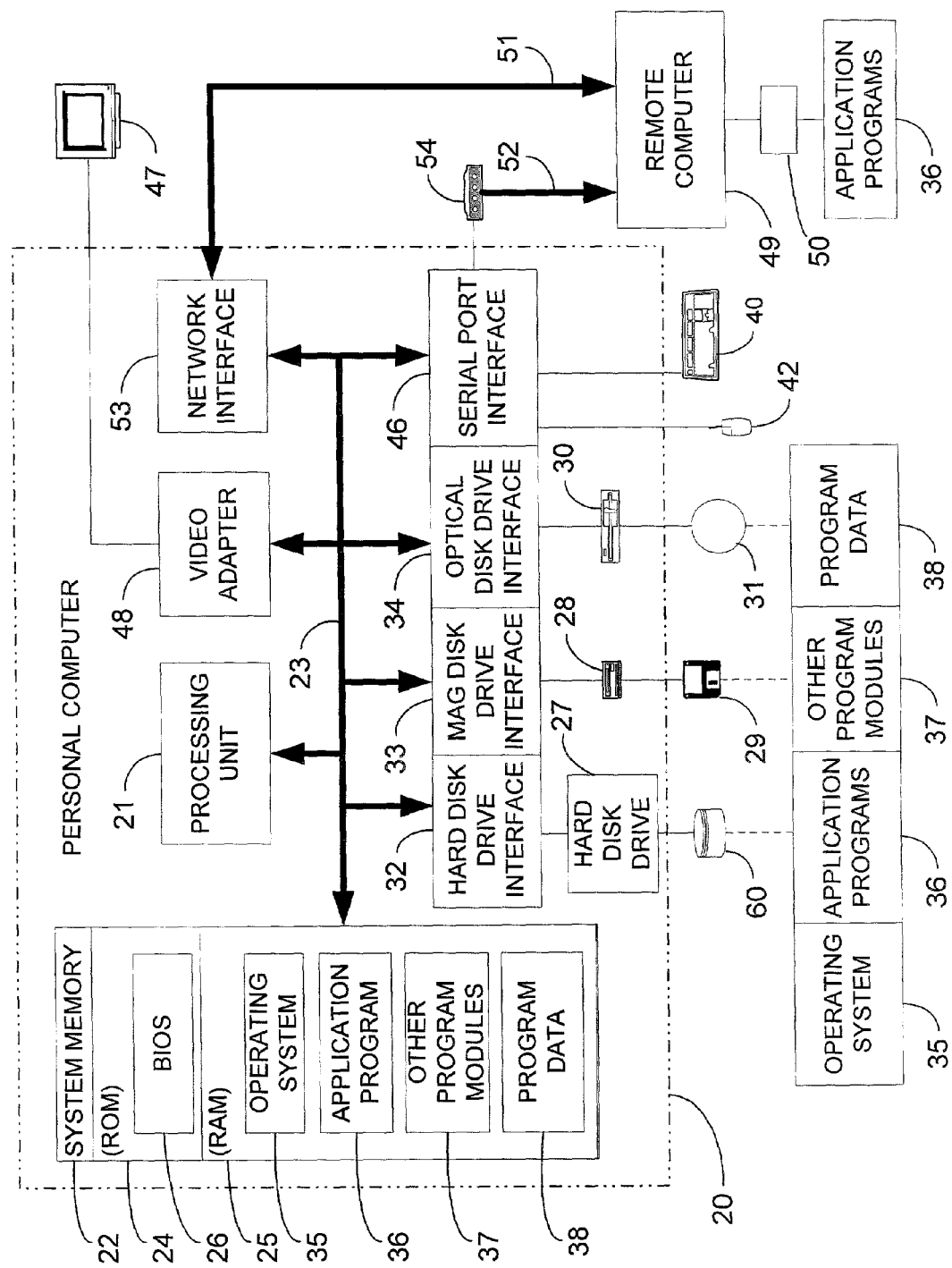
FIG. 1 is a block diagram generally illustrating an exemplary computer system on which the present invention may reside.

Turning to the drawings, wherein like reference numerals refer to like elements, the invention is illustrated as being implemented in a suitable computing environment. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional personal computer 20, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system (BIOS) 26, containing the basic routines that help to transfer information between elements within the personal computer 20, such as during start-up, is stored in ROM 24. The personal computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer readable instructions, data structures, program modules and other data for the personal computer 20. Although the exemplary environment described herein employs a hard disk, a removable magnetic disk 29, and a removable optical disk 31, it will be appreciated by those skilled in the art that other types of computer readable media which can store data that is accessible by a computer, such as magnetic cassettes, flash memory cards, digital video disks, Bernoulli cartridges, random access memories, read only memories, and the like may also be used in the exemplary operating environment.

A number of program modules may be stored on the hard disk, magnetic disk 29, optical disk 31, ROM 24 or RAM 25, including an operating system 35, one or more applications programs 36, other program modules 37, and program data 38. A user may enter commands and information into the personal computer 20 through input devices such as a keyboard 40 and a pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port or a universal serial bus (USB). A monitor 47 or other type of display device is also connected to the system bus 23 via an interface, such as a video adapter 48. In addition to the monitor, personal computers typically include other peripheral output devices, not shown, such as speakers and printers.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the local network 51 through a network interface or adapter 53. When used in a WAN networking environment, the person computer 20 typically includes a modem 54 or other means for establishing communications over the WAN 52. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

In the description that follows, the invention will be described with reference to acts and symbolic representations of operations that are performed by one or more computers, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer, which reconfigures or otherwise alters the operation of the computer in a manner well understood by those skilled in the art. The data structures where data is maintained are physical locations of the memory that have particular properties defined by the format of the data. However, while the invention is being described in the foregoing context, it is not meant to be limiting as those of skill in the art will appreciate that various of the acts and operation described hereinafter may also be implemented in hardware.

Figure 2:
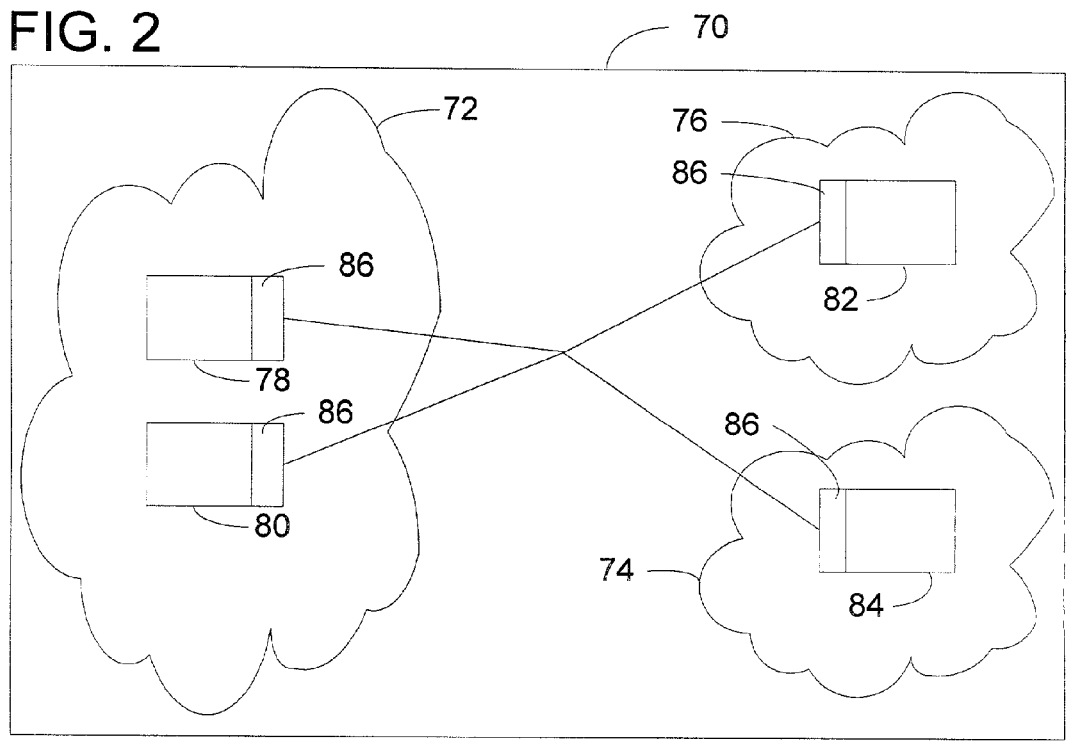
FIG. 2 is a block diagram illustrating a network system having a plurality of sub-networks in which the present invention may be used.

The present invention is directed to the use of an adaptive flow control protocol that adjusts its data transfer strategy based on the behavior of the communicating applications. FIG. 2 shows a representative environment in which the adaptive flow control protocol of the invention may operate. The environment includes a distributed system 70 having local sub-networks 72, 74, 76. Local sub-network 72 has computers 78, 80, and local sub-networks 74, 76 have computers 82 and 84 respectively. It should be noted that distributed system 70 may have additional local sub-networks and local sub-networks 72, 74, 76 may have additional computers. Each computer 78, 80, 82 is served by a transport provider 86 for providing communication between computers and between applications residing on computers. Each transport provider may be a primary transport provider, such as TCP/IP, or an alternative transport provider. When an application makes a call to communicate with another application using an alternate transport provider that is capable of providing the communication service, the adaptive flow control protocol is used.

Figure 3:
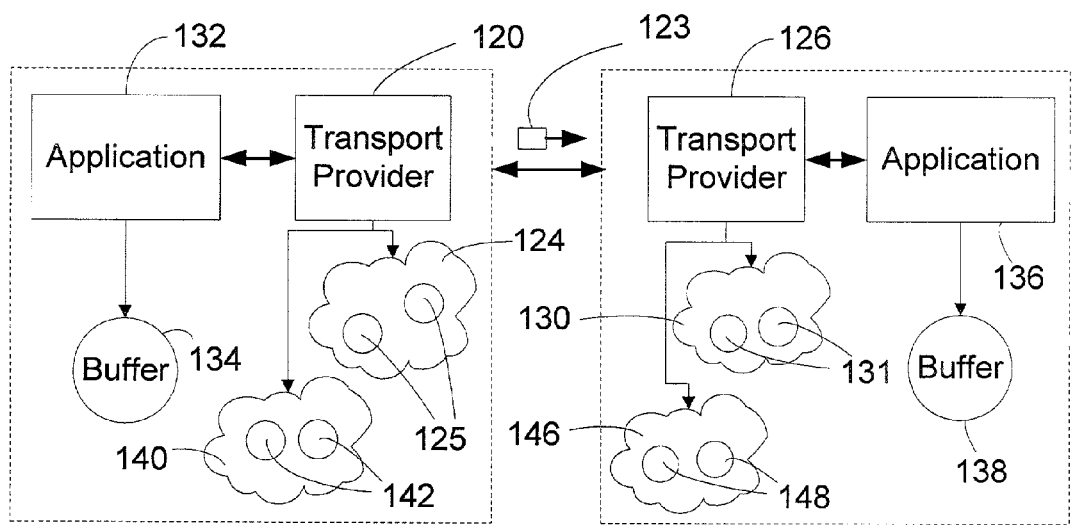
FIG. 3 is a block diagram illustrating a data transfer between two applications connected using the protocol of the instant invention.

For purposes of illustration, FIG. 3 illustrates a data transfer between two applications 132, 136 connected to transport providers 120, 126 using the adaptive flow control protocol. While FIG. 3 shows the transport providers using the adaptive flow control protocol, those skilled in the art will recognize that the adaptive flow control protocol may be implemented in operating system 35, application program 36, or other program modules 37. The transport providers 120, 126 arrange a session for the applications. The local transport provider 120 associates (i.e., registers) a set of receive buffers 124 and send buffers 140 with the connection and sends a message 123 to the remote transport provider 126. A message 123 can be sent by either transport provider. The message 123 includes the number of buffers in the set of receive buffers 124. The remote transport provider also associates a set of receive buffers 130 and send buffers 146 with the connection. It should be appreciated that the receive buffers and send buffers can be combined into a single set of buffers. The local transport provider 120 buffers the first message sent if the remote transport provider 126 does not post the receive set buffers 130 before the first message is sent. It should be appreciated that the local transport provider 120 could also buffer other messages. The remote transport provider 126 sends a response to the message and the response includes the number of buffers in the set of receive buffers 130.

Each transport provider 120, 126 provides a flow control protocol to synchronize data transfer for small data transfers and large data transfers. One reason for this is that the applications 132, 136 may exhibit different behavior when receiving data. The application may not post a set of receiving buffers until it is informed that data is available to be received or the application may post a set of receiving buffers when it requests to receive data. The application's set of receiving buffers may also be large or small. The set of receiving buffers could be a single buffer or an array of buffers. If the receiving buffer set is large enough, bulk data transfer through Remote Direct Memory Access (RDMA) as known by those skilled in the art is used. The threshold size for using bulk data transfer is based upon justifying the cost of initiating RDMA. Each RDMA operation has a cost which is a function of the control messages exchanged by the transport providers 120, 126, and the SAN NIC hardware operations needed to support RDMA operation. The transport provider 120, 126 queries the SAN provider for the threshold size. Typically, the threshold size for a SAN provider is in the range of 2 KB to 4 KB. It should be noted that RDMA could be used for smaller data sizes than the threshold size.

After the connection is established, one of the applications 132, 136 requests that data be sent to or received from the other application. For purposes of illustration, application 132 issues a request to the transport provider 120 to receive data from application 136. Application 132 becomes a receiving application and application 136 becomes a sending application. Application 132 may post an initial receiving buffer set 134 or it may wait until it gets notice that data is available to be received.

When application 136 makes a request to transport provider 126 to send the data, the application 136 posts the data in a transmission buffer 138. The transport provider 126 detects the data size and decides whether to use RDMA data transfer or messages to transfer the data to application 132.

Figure 4:
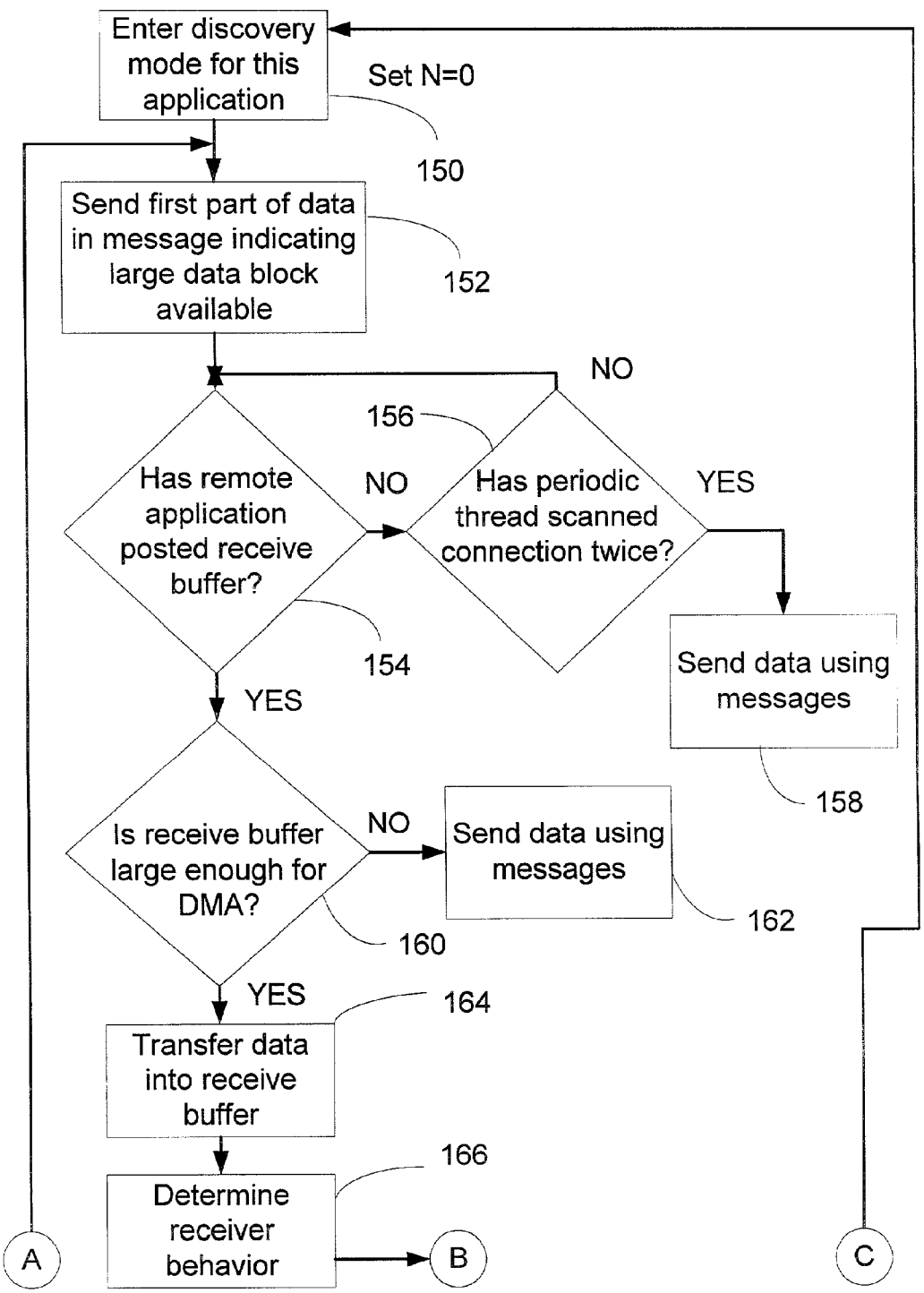
FIG. 4 is a flow chart illustrating a first portion of a process for transferring large data blocks.
Figure 5:
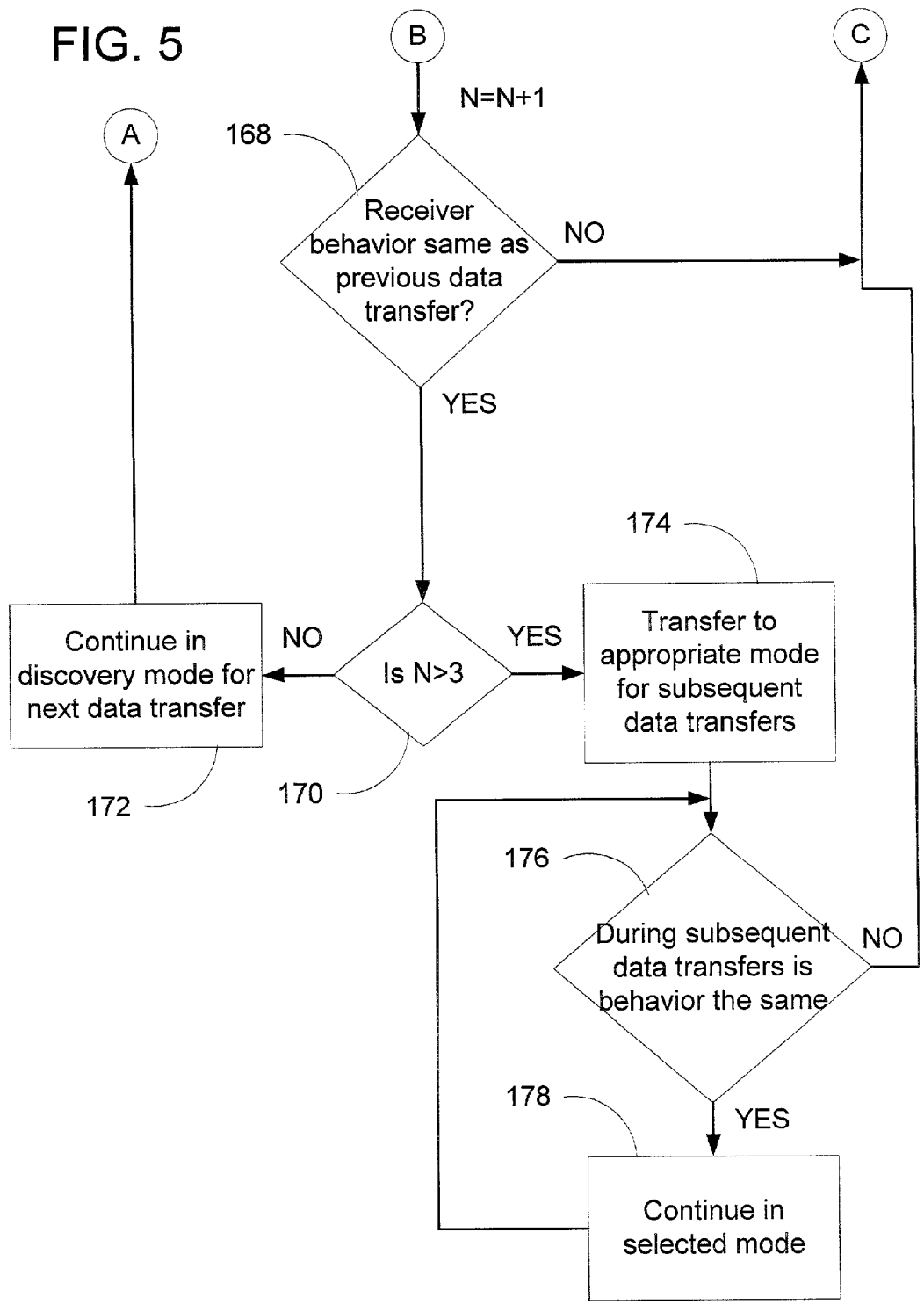
FIG. 5 is a flow chart illustrating a remaining portion of the process for transferring large data blocks.
Figure 6:
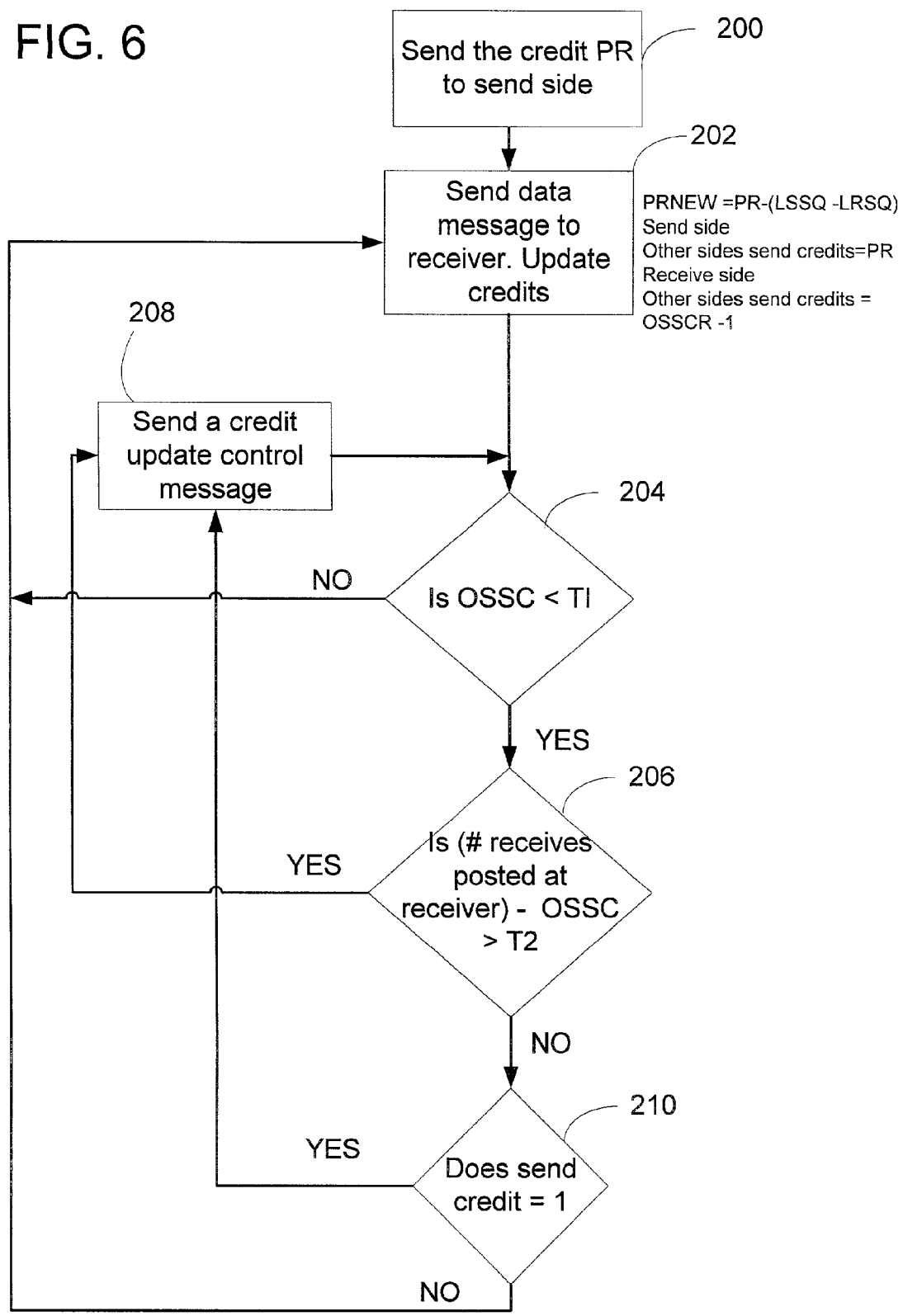
FIG. 6 is a flow chart illustrating a data transfer process in which credits are used to ensure that a receiving device has a buffer posted to receive messages when messages are transferred between a receiving device and a sending device.
Figure 7:
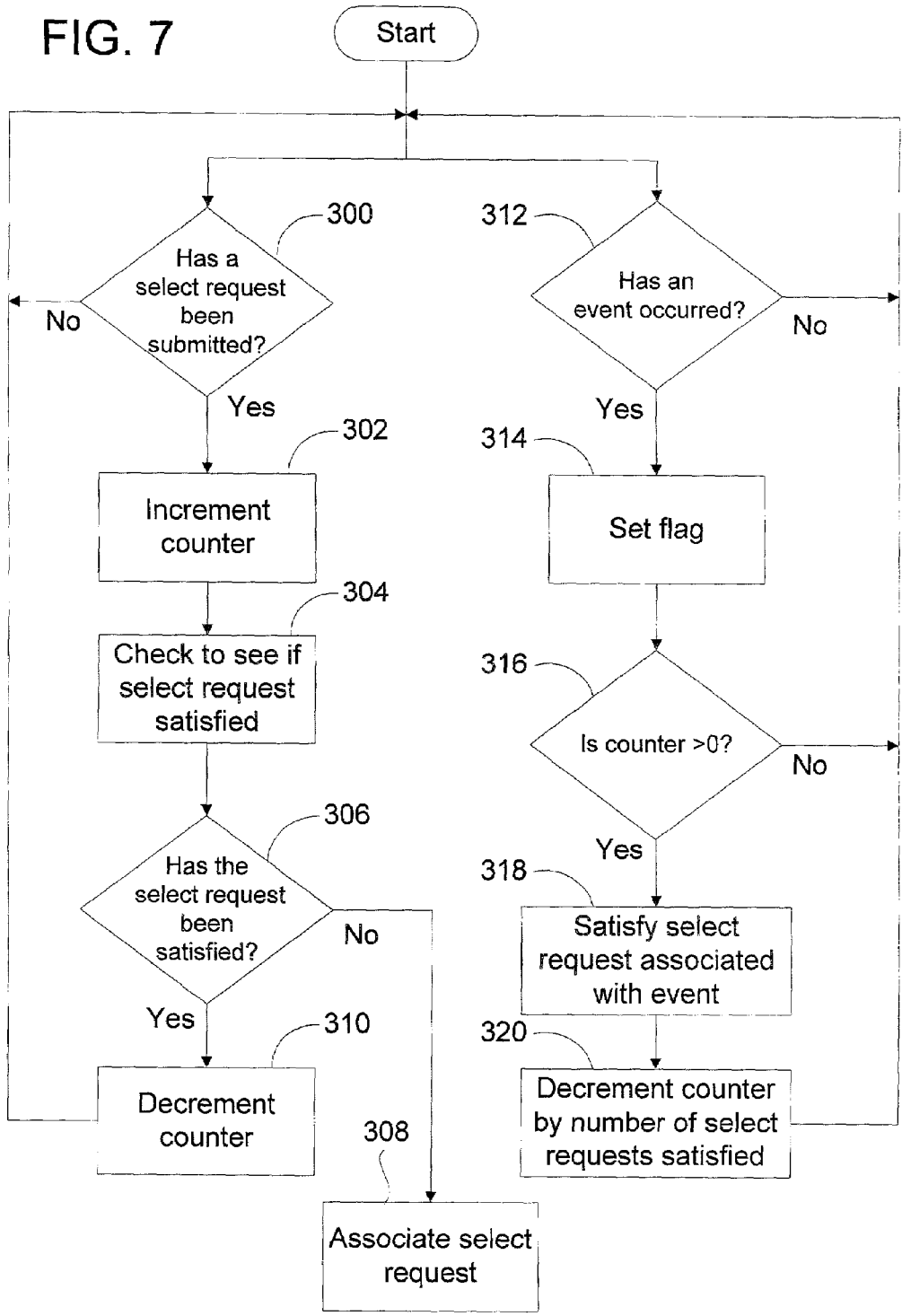
FIG. 7 is a flow chart illustrating a process in which the number of kernel mode transitions to send and receive data is minimized to fully utilize the performance advantages of alternate transport providers.

FIGS. 4–6 show a flow diagram representative of the steps the transport providers 120, 126 take during data transfers. If the transport providers 120, 126 decide that RDMA data transfer is to be used, the transport providers 120, 126 enter into a discovery mode 150. The purpose of discovery mode is to determine the behavior of the application 132 receiving the data. If the behavior is consistent for a select number of data transfers, the transport provider 126 will adapt the way it provides data to the application 132 to provide the best performance for the application 132 in use. Steps 150 to 178 in the flow chart of FIGS. 6 and 7 are representative of the steps that each transport provider's 120, 126 protocol performs in discovery mode.

The transport provider 126 copies an initial portion of the data to a message buffer 148 and sends the initial portion of the data in an initial message to transport provider 120 via message buffer 125 (step 152). The initial message includes information to indicate the size of the data to be transferred.

Transport provider 120 then checks whether application 132 has posted receive buffers 134 (step 154). Transport provider 126 will not send any additional data until transport provider 120 notifies it through a message that application 132 has posted receive buffers 134. To avoid a possible deadlock where transport provider 126 is waiting for an indication that application 132 has posted receive buffers 134 and application 132 has not posted receive buffers 134, each transport provider 120, 126 periodically scans connections it is overseeing to see if a deadlock exists.

The transport provider 120 waits for the application 132 to post receive buffers 134 (step 156). If the periodic scan has occurred a number of times, preferably two, and the application has still not posted receive buffers 134, the transport provider 126 will send the remainder of the data in messages (step 158).

If the application 132 has posted receive buffers 134, the transport provider 120 determines if the size of the receive buffers 134 is large enough to justify the cost of RDMA (step 160). If the size of the receive buffers 134 is not large enough, the transport provider 120 sends a message 123 to transport provider 126 instructing transport provider 126 to send the remainder of the data in messages (step 162). If the size of the receive buffers 134 is large enough for RDMA, transport provider 120 and transport provider 126 transfer data into the receive buffer (step 164) as described below.

If the size of the receive buffers 134 is large enough to justify the cost of RDMA, then local transport provider 120 sends a message 123 to remote transport provider 126. The message 123 includes the location of the application's set of receiving buffers 134, and whether the application 132 posted the set of receiving buffers 134 directly or waited until it received an indication that data was available to be received. Remote transport provider 126 transfers an amount of data equal to the size of the set of receiving buffers 134 from the set of transmission buffers 138 into the set of receiving buffers 134 using one or more RDMA write operations. Remote transport provider 126 continues to transfer data into the set of receiving buffers 134 as more buffers are posted into the set of receiving buffers 134 until all of the data is transferred. The remote transport provider 126 then sends a message 123 to local transport provider 120 indicating that the data transfer is complete and also notifies application 136 that the data transfer is complete. Local transport provider 120 then signals the application 132 that the data transfer is complete.

The transport providers 120, 126 then determine the behavior of the application 132 (step 166). There are three representative modes in which the application 132 could receive data. One mode is the large receive mode where the application 132 posted the set of receiving buffers 134 directly when it accepted the request to receive data. Another mode is the small-receive-large-receive mode where the application 132 waited until it received an indication that data was available to be received before it posted the set of receiving buffers 134. Another mode is the small receive mode where the application 132 posted the set of receiving buffers 134, but the size of the set of receiving buffers 134 is not large enough to justify the cost of RDMA operations.

For subsequent data transfers, the transport providers 120, 126 repeat steps 152 to 166 while the application's behavior is determined. The remote transport provider 126 determines if the application's behavior during the data transfer is the same representative mode as the previous data transfer (step 168). The transport providers 120, 126 repeat steps 152 to 168 until the application's behavior is determined to be the same representative mode for a predetermined number of times, preferably three (steps 170 and 172).

If the application's behavior is determined to be the same representative mode for the predetermined number of times, the transport providers 120, 126 adapt the way data is transferred on subsequent data transfers according to the application's behavior (step 174). If the application's behavior changes during subsequent data transfers, the transport providers 120, 126 reenter the discovery mode (step 176). Otherwise, the transport providers 120, 126 continue to transfer data according to the application's behavior (step 178).

If the remote transport provider 126 determines that the application's behavior is the small receive mode, remote transport provider 126 sends all data in messages. If the application 132 posts a set of receiving buffers 134 that is large enough for RDMA, local transport provider 120 sends a message 123 to remote transport provider 126 to reenter discovery mode.

Many applications only need to exchange messages that are a few hundred bytes in size. In order to conserve resources, in one embodiment, the size of messages in small receive mode is set to a default buffer size that is relatively small. For example, the size can be set to 1.5 kB sized buffers. For applications that regularly exchange data larger than the default buffer size but smaller than the RDMA size, the data will be exchanged in multiple messages, which increases overhead. The adaptive flow control protocol provides the capability to increase the default size if needed.

The transport provider 126 gathers statistics on whether the data sent had to be fragmented and keeps track of the largest data size sent. If the number of fragmentations is above a predetermined level, the transport provider 126 sends a Resize request message to transport provider 120 asking transport provider 120 to increase the size of its receive buffers 124 from an old size to a new size. The transport provider 120 waits for all of its posted receive buffers 124 to complete and then registers larger sized buffers set to the size of the largest data size sent. If there is not enough memory available to use the larger sized buffers, the transport provider 120 continues to use the old size of receive buffers 124 and sends a message to transport provider 126 telling transport provider 126 the resized buffer size, which is the same size as the old size. If there is enough memory available to use the larger sized buffers, transport provider 120 deregisters the old size buffers and sends a message to transport provider 126 indicating the resized buffer size, which is the new size.

Once the transport provider 126 receives the message about the resized buffer size, it determines if the resized buffer size is greater than the old size. If the resized buffer size is not greater than the old size, the transport provider 126 continues to use buffer sizes equal to the old size. If the resized buffer size is greater than the old size, the transport provider 126 waits for all pending messages to the transport provider 120 to complete, then registers new buffers sized to the resized buffer size. If both transport providers 120, 126 concurrently send each other Resize request messages, a deadlock may occur. In order to avoid a deadlock, the transport provider that accepted when the connection was initially established (i.e. the accepting peer) disregards the Resize request message, while the transport provider that did connect when the connection was initially established (i.e., the connecting peer) proceeds to responds to the Resize request message. The connecting peer may re-send a Resize request message after sending the message about the resized buffer size.

In an alternative embodiment, the default buffer size is set to a fixed size. If the fixed size is smaller than the size of the data to be sent, the data is sent in multiple messages (i.e., the data is fragmented) of the fixed size. The fixed size may also be set to a large value. This avoids the need for fragmented data.

If the remote transport provider 126 determines that the application's behavior is the small-receive-large-receive mode, then the transport providers 120, 126 can transfer the data in one of two ways. The first way is only available if the transport provider 120 supports transferring data directly from a remote buffer to a specified local buffer through RDMA read operations. If the transport provider 120 supports RDMA read operations, remote transport provider 126 sends a message 123 to local transport provider 120. The message 123 contains an initial portion of the data and also includes the location of the application's set of transmission buffers 138 and the size of the data to be transferred. Local transport provider 120 uses the initial portion of the data received through message 123 to satisfy the application's initial small receive request. Application 132 then posts a large receive buffer. Local transport provider 120 then transfers the data from the set of transmission buffers 138 directly into the application's set of receiving buffers 134 using one or more RDMA read operations. Local transport provider 120 transfers an amount of data equal to the size of the set of receiving buffers 134 from the set of transmission buffers 138 into the set of receiving buffers 134. Local transport provider 120 continues to transfer data into the set of receiving buffers 134 as more buffers are posted into the set of receiving buffers 134 until all of the data is transferred. Once all of the data is transferred, the local transport provider 120 sends a message 123 to remote transport provider 126 indicating that the data transfer is complete. The remote transport provider 126 then signals the application 136 that the data transfer is complete. If the application 136 requests to send a small amount of data that is not large enough for RDMA, remote transport provider 126 sends data through a message 123 and not through RDMA. The data is then copied by local transport provider 120 to the set of receiving buffers 134 and on subsequent data transfers, the transport providers 120, 126 continue in the small-receive-large-receive mode.

If RDMA read is not supported, then the transport providers 120, 126 transfer data using RDMA write operations. If the size of the set of receiving buffers 134 is large enough, then local transport provider 120 sends a message 123 to remote transport provider 126. The message 123 includes the location of the application's set of receiving buffers 134. Remote transport provider 126 transfers an amount of data equal to the size of the set of receiving buffers 134 from the set of transmission buffers 138 into the set of receiving buffers 134 using one or more RDMA write operations. As more receiving buffers 134 are posted by the application 132, local transport provider 120 informs remote transport provider 126 of these buffers through messages 123. Remote transport provider 126 continues to transfer data into the set of receiving buffers 134 as more buffers are posted into the set of receiving buffers 134 until all of the data is transferred. The remote transport provider 126 then sends a message 123 to local transport provider 120 indicating that the data transfer is complete and also notifies application 136 that the data transfer is complete. Local transport provider 120 then signals the application 132 that the data transfer is complete.

If the remote transport provider 126 determines that the application's behavior is the large receive mode, remote transport provider 126 sends a message 123 informing the local transport provider 120 to change modes. After sending this message, the remote transport provider 126 becomes passive in the sense that it will not initiate data transfers any more. Instead, all data transfers are initiated by the local transport provider 120. When application 132 posts a set of receive buffers 134, local transport provider 120 sends a message 123 to remote transport provider 126 which includes the size of the set of receive buffers 134 and the location of the set of receive buffers 134.

When application 136 requests that a large block of data be sent, remote transport provider 126 transfers an amount of data equal to the size of the set of receiving buffers 134 from the set of transmission buffers 138 into the set of receiving buffers 134 using one or more RDMA write operations. Remote transport provider 120 continues to transfer data into the set of receiving buffers 134 as more buffers are posted into the set of receiving buffers 134 until all of the data is transferred. The remote transport provider 126 then sends a message 123 to local transport provider 120 indicating that the data transfer is complete and also notifies application 136 that the data transfer is complete. Local transport provider 120 then signals the application 132 that the data transfer is complete.

If the application 136 requests to send a small amount of data that is not large enough for RDMA, remote transport provider 126 sends data through a message 123 via message buffers 142, 131 and not through RDMA. The data is then copied by local transport provider 120 from a message buffer 125 to the set of receiving buffers 134. On subsequent data transfers, the transport providers 120, 126 continue to transfer data in large receive mode. If the application 132 changes its behavior and instead of directly posting a set of receive buffers 134, it posts a set of receive buffers 134 that is not large enough for RDMA operations, or waits for an indication that data is available to be received before posting a set of receive buffers 134, then the local transport provider 120 sends a message 123 to the remote transport provider 126 to go back to discovery mode. If the application 132 does not post a set of receiving buffers 134 or wait for incoming data, a deadlock could occur. The periodic scan detects this and the transport provider 126 sends a message to transport provider 120 to reenter the discovery mode and transport provider 126 sends the remainder of the data in messages.

In one embodiment, RDMA read is also used in the large receive mode using the same procedure discussed above for the small-receive-large-receive mode. In this mode of operation, the receiving transport provider (e.g., transport provider 120) may advertise receive buffers to the sending transport provider (e.g., transport provider 126) by sending a RDMA receive advertisement in a message. If transport provider 126 receives a RDMA receive advertisement message, it must use RDMA write operations that are initiated by the transport provider 120 to transfer data. In this case, if the transport provider 126 has already sent out a message 123 to inform the transport provider 120 that data is available to be sent, then the transport provider 120 must ignore the RDMA information (e.g., the location of the application's set of transmission buffers and the size of the data to be transferred) in that message. If the transport provider 120 receives the message that data is available to be sent and it has not already sent a RDMA receive advertisement message, then it must refrain from doing so and proceed to transfer data using the RDMA Read operation.

The RDMA receive advertisement message requires an additional message to be exchanged. In one embodiment, the RDMA receive advertisement message is combined with a data transfer message sent from application 132 to application 136. In order to combine the message, the transport provider 120 first determines if the application 132 posts large receive buffers before or after the request to send data through messages.

If the large receive buffers are posted before application 132's request to send data (i.e., receive-send mode) the transport provider 120 takes the following actions.
1. Continue normal operation when large receives are posted.
2. If an application posts a small send (i.e., the size of send data is smaller than the RDMA threshold, which results in data being sent in messages) and data or RDMA Read information hasn't been received from the transport provider 126, then the transport provider 120 sends the request for data and the RDMA receive advertisement in the same message.

3. If the application never requests to send any data (i.e., the application posts a large receive buffer but does not follow up with a send request), then the receive will be taken care of by the data transfer mechanism previously described for large-receive mode with RDMA read operations.
4. If the application does a large send for the request instead of doing a small send, then proceed to transfer the send data using the current send data transfer mode. No messages are combined and the application's receive is taken care of through RDMA Read.

If the large receive buffers are posted after the application 132's request to send data (i.e., send-receive mode) the transport provider 120 takes the following actions.

1. When a small send happens, copy the data to a send buffer from the set of buffers 140 and leave enough space at the beginning of the send buffer to put in the RDMA receive advertisement in the header and start a timer.
2. If the application posts a large receive before the timer expires, which is typical, then the RDMA receive advertisement is added to the header and the message is sent.
3. If the timer expires with no action taken by the application, then a standard message header is used and the send data is sent.
4. If an application does a large send, then the transport providers proceed to transfer the send data using the current send data transfer mode. Subsequent application receives are taken care of by the data transfer mechanism for large receive mode with RDMA Read.

The send-receive mode actions are only taken if the transport providers are able to detect with certainty that the application is in the send-receive mode.

The adaptive flow control protocol automatically detects whether an application is in the send-receive mode or the receive-send mode. The protocol determines that an application 132 is in send-receive mode if (1) the application 132 posts a large receive buffer; (2) the application 136 does a send causing the receive posted by application 132 to complete; and (3) the application 132 does a small send. The protocol determines that an application 132 is in receive-send mode if (1) the application 132 posts a large receive buffer; (2) the application 132 performs a small send; and (3) the application 136 does a send causing the receive posted by application 132 to complete. Those skilled in the art will appreciate that application 132 may post multiple receive buffers to completely receive the data sent by application 136.

During data transfers in any of the modes, the transport providers 120, 126 send messages 123 to each other concerning both applications' requests and responses to send or receive data. There can be instances where these messages become outdated. To account for outdated messages, the transport provider 120, 126 on the side that has an application that has already posted a set of receiving buffers of sufficient size to receive multiple messages, will only allow one message to be transferred into that set of receiving buffers. Then the transport providers 120, 126 detect outdated information by the steps as follows. (1) The transport provider 120, 126 on the side that is sending data to an application keeps track of the number of messages sent which contain an application's data. (2) The transport provider 120, 126 on the side that is receiving data keeps track of the number of messages received which contain application data and includes this number when it sends a message to the sending side transport provider indicating that the application that is receiving data has a set of receiving buffers posted and the size of the set of receiving buffers posted is large enough for RDMA. (3) The transport provider 120, 126 on the side that is sending data then uses the difference in the number of data messages sent and the number received at the time the transport provider 120, 126 on the side that is receiving data sent the message in step 2 to decide if the set of receiving buffers under question is still available or has been satisfied using data from messages. If it has been satisfied using data from messages, then the send-side simply discards this message as being outdated.

If the transport providers 120, 126 decide that messages should be used to transfer data or when the transport providers 120, 126 send messages during RDMA data transfers, the transport providers 120, 126 must ensure that when one transport provider sends a message, the other transport provider has a set of receiving buffers posted to accept the message as the SAN hardware may not have the capability to buffer data.

Turning now to FIG. 6, the flow control protocol to synchronize data transfer for messages ensures that a receiving buffer is available when a message is sent by using credits as explained below. For purposes of explanation, transport provider 120 is on the side where application 132 is receiving data and transport provider 126 is on the side where application 136 is sending data. The transport provider 120 provides a credit to the transport provider 126, equal to the number of message buffers 125 transport provider 120 has currently posted. Transport provider 126 will not send more messages 123 than this number until it receives more credit. This ensures that a message buffer 125 is always posted when the transport provider 126 sends a message 123. If no credit is available and the application 136 tries to send data, then this operation will either be blocked or data will be buffered internally by the transport provider 126. If the transport provider 126 needs to send a message 123 when no credit is available, then the transport provider 126 will buffer the message 123 until credit becomes available.

The transport provider 126, in the header of each message 123 that it sends, includes the number of currently posted message buffers 131 denoted by initials PR for "posted receives" as indicated by step 200. If the transport provider 126 is multithreaded, it may gain performance advantages by not using locks to synchronize operations on the same socket by different threads. As a result, data can become misordered, despite the fact that the SAN provider delivers data in order. To account for this, each message 123 is also assigned a sequence number to ensure that data is put back into the correct order using the sequence numbers.

The header also includes the sequence number of the last message the transport provider 126 has received before sending this message, denoted by the initials LRSQ for "last received sequence number". Upon receiving this message, the transport provider 120 uses this information to update its send credit as indicated in step 202 according to the formula New send credit=$PR-(LSSQ-LRSQ)$ where LSSQ ("last sent sequence number") is the sequence number of the last message sent by the transport provider 120.

In some instances such as sustained unidirectional data flow, transport provider 126 may run out of send credit and credit cannot be refreshed as part of the data transfer process. In such situations, the transport provider 120 on the side where an application is receiving data will send a special credit update control message to transport provider 126.

There can be situations where transport provider 126 sends a message 123 and runs out of credit. Transport provider 120 realizes that transport provider 126 is out of credit, so as soon as one receive buffer is freed up, it sends a credit update control message back to transport provider 126, but this only gives transport provider 126 one credit. The cycle keeps repeating and results in high overhead (one control message for each data transfer message).

To avoid this situation, each transport provider 120, 126 needs to track the other transport provider's send credit. Each transport provider maintains a variable OtherSidesSendCredit which is updated as follows:

When a transport provider sends a message to the other transport provider, then the transport provider sets:
   OtherSidesSendCredit=the PR value in the outgoing message's header Upon receiving a message:
   OtherSidesSendCredit=OtherSidesSendCredit−1

A credit update message is sent only when the OtherSidesSendCredit falls below a predetermined threshold T1, and the number of receive buffers 125 posted at the side receiving data is greater than OtherSidesSendCredit by a predetermined threshold T2.

If the OtherSidesSendCredit is greater than the predetermined threshold T1, then no credit update message is required as indicated by step 208. If the OtherSidesSendCredit is less than the predetermined threshold T1, then the number of receive buffers 125 is checked. If the number of receive buffers 125 is greater than the predetermined threshold T2, the transport provider 120 will send a credit update control message to transport provider 126 as indicated by step 206 and step 208. This ensures that every credit update message causes the sending transport provider's credit to increase by at least T2, and this avoids the one control message for each data transfer message scenario as long as T2 is greater than 1.

The value of T2 is based on the total number of receive buffers allocated per connection. For 10–12 receive buffers, a value of 5–6 is exemplary.

The value of T1 should be chosen so that in case of a uni-directional data flow, the receiving side has sufficient time to send a credit update message to the sending side before the sending side blocks the message from being sent due to insufficient send credit. A value of 3–4 is exemplary.

Credit update messages need to be flow controlled themselves to avoid a deadlock where both transport providers end up with zero send credit, and even though they have receives posted, they cannot update each other's send credit. This deadlock is avoided by only allowing a credit update message to be sent if send credit falls to 1 as indicated by step 210. If send credit is 1, all messages containing application data are blocked and all other messages, other than a credit update message, are buffered and queued internally by the transport providers. Then, when all the conditions to send a credit update message are satisfied, the final credit is used up to update the other transport provider's send credit.

One of the operating systems in which the present invention may be used is the Windows® operating system as provided by Microsoft Corporation. In the Windows® operating system, a socket implementation is required to notify an application through some form of select API (e.g. BSD sockets select API, Winsock WSAEventSelect, or WSAAsyncSelect) if the application has registered to be notified when certain events occur. These events are when normal or out-of-band data is received and no data is buffered on behalf of the application or when data can be sent after it was previously blocked due to flow control (a window is closed, no credits are available, etc.). The select API typically associate a kernel object (e.g., a thread to wake up for the case of BSD sockets select API, an event to signal in the case of WSAEventSelect, or a windows message queue in which to deliver a message in the case of WSAAsyncSelect) with the socket implementation for these events. When a socket implementation in the user mode of Windows® learns about one of these events, it needs to make a call to the kernel mode of Windows® (i.e., a kernel call) just to verify that no select requests are currently outstanding. The net effect of these kernel calls is that a kernel transition is added to nearly every send and receive operation.

The present invention minimizes the number of kernel calls by maintaining a count of select requests that are outstanding. The count is incremented every time a kernel object for the select request is associated with the socket implementation. The count is decremented whenever an association between a kernel object and the socket implementation is broken, which occurs whenever the socket implementation signals the kernel object or when the select request/association is canceled or undone. A separate counter is used on a per-socket basis for each select request associated with sending or receiving data. These select requests are FD_READ (data is available to receive), FD_OOB (out-of band (OOB) data is available to receive, and FD_WRITE (a window is opening for send (e.g., a send is possible)).

Turning now to FIG. 7, the steps taken to minimize the number of kernel transitions are illustrated. For purposes of illustration, the invention will be described for an FD_READ select request and the steps will be described sequentially. Additionally, the component that implements the socket shall be called a socket application. It should be noted that the steps can be performed sequentially, in parallel, or a combination of sequential and parallel and that the same or similar steps are performed for the other select requests. Furthermore, those skilled in the art will recognize that the socket application may be part of the operating system 35, applications programs 36, or other program modules 37.

Whenever an application submits an FD_READ select request, the socket application detects it (step 300) and increments a select request counter for the FD_READ event on the given socket (step 302). The socket application then takes lock that protects the select request association for the socket and checks to see if the select request has been satisfied (step 304). If the select request has not been satisfied (step 306), the socket application associates the select request with the socket, releases the lock, and then informs the application to wait for the FD_READ event of interest (step 308). If the select request has been satisfied, the lock is released and the select request counter is decremented. The application select request is then satisfied (step 310). Steps 300–310 are then repeated whenever a select request has been submitted.

The socket application also determines when an event occurs that triggers a select request (step 312) One example of an event occurring is that a sending application sends a message to a receiving application that there is data available to be received. If an event occurs that triggers the select request, a flag is set that identifies the FD_READ condition so that further requests can be satisfied (step 314). The socket application checks the select request counter to determine if there are any outstanding select requests for the triggered condition (e.g., FD_READ event) (step 316). If the counter is zero, the socket application continues to monitor for select requests and events. If the counter is above zero, the socket application makes a kernel call to satisfy the select request, takes the lock, and checks it to see if there are any select request associated with the socket for the event of interest (e.g., FD_READ) and satisfies all of them (step 318). The counter of the outstanding request is then decremented by the number of select requests satisfied (step 320). Steps 312-320 are then repeated whenever an event occurs.

All of the references cited herein, including patents, patent applications, and publications, are hereby incorporated in their entireties by reference.

In view of the many possible embodiments to which the principles of this invention may be applied, it should be recognized that the embodiment described herein with respect to the drawing figures is meant to be illustrative only and should not be taken as limiting the scope of invention. For example, those of skill in the art will recognize that the elements of the illustrated embodiment shown in software may be implemented in hardware and vice versa or that the illustrated embodiment can be modified in arrangement and detail without departing from the spirit of the invention. Therefore, the invention as described herein contemplates all such embodiments as may come within the scope of the following claims and equivalents thereof.

We claim:

1. A method to transfer data from a sending application to a receiving application in a computer environment, the method comprising the steps of:
    if the receiving application posts a receive buffer exceeding a threshold size when posting a send for a preselected number of initial data blocks:
        transferring subsequent data having sizes greater than the threshold size using direct memory access read operations:
    detecting if the receiving application posts the receive buffer prior to posting the send;
    if the receiving application posts the receive buffer prior to posting the send:
        if the receiving application posts a send buffer having a size below the threshold size and one of data and Remote Direct Memory Access (RDMA) Read information has not been received, sending data and a RDMA receive advertisement in a message;
    detecting if the receiving application posts the receive buffer after posting the send:
    if the receiving application posts the receive buffer after posting the send:
        copying data to a send buffer having sufficient space at a beginning of the send buffer to put a receive advertisement in a message's header when a small send happens;
        starting a timer;
        putting the receive advertisement in the message's header if the receiving application posts a receive buffer exceeding the threshold size before the timer expires; and
        sending the message.

2. The method of claim 1 wherein the step of detecting if the receiving application posts the receive buffer prior to posting the send comprises the steps of:
    determining if the receiving application posts a large receive buffer;
    determining if the sending application does a send causing the receive posted by the receiving application to complete; and
    determining if the receiving application does a small send.

3. The method of claim 1 wherein the step of detecting if the receiving application posts the receive buffer after posting the send comprises the steps of:
    determining if the receiving application posts a large receive buffer;
    determining if the receiving application performs a small send; and
    determining if the sending application does a send causing the receive posted by receiving application to complete.

4. The method of claim 1 further comprising the step of putting a standard header onto the send data if the receiving application does not post a receive buffer exceeding the threshold size before the timer expires.

5. The method of claim 1 wherein the computer environment has at least one system area network.

6. One or more computer-readable media having executable instructions that, when executed, implement a method to transfer data from a sending application to a receiving application in a computer environment using direct memory access read operations, the method comprising the following steps:
    detecting if the receiving application posts the receive buffer prior to posting the send;
    if the receiving application posts a receive buffer prior to posting a send:
        if the receiving application posts a send buffer having a size below the threshold size and one of data and Remote Direct Memory Access (RDMA) Read information has not been received, sending data and a RDMA receive advertisement in a message;
    detecting if the receiving application posts the receive buffer after posting the send;
    if the receiving application posts the receive buffer after posting the send:
        copying data to a send buffer having sufficient space at a beginning of the send buffer to put a receive advertisement in a message's header when a small send happens:
        starting a timer;
        putting the receive advertisement in the message's header if the receiving application posts a receive buffer exceeding the threshold size before the timer expires; and
        sending the message.

7. The one or more computer-readable media of claim 6 wherein the step of detecting if the receiving application posts the receive buffer prior to posting the send comprises the steps of:
    determining if the receiving application posts a large receive buffer;
    determining if the sending application does a send causing the receive posted by the receiving application to complete; and
    determining if the receiving application does a small send.

8. The one or more computer-readable media of claim 6 wherein the step of detecting if the receiving application posts the receive buffer after posting the send further comprises the steps of:

determining if the receiving application posts a large receive buffer;

determining if the receiving application performs a small send; and determining if the sending application does a send causing the receive posted by receiving application to complete.

9. The one or more computer-readable media of claim 6 having further executable instructions for performing an additional step comprising putting a standard header onto the send data if the receiving application does not post a receive buffer exceeding the threshold size before the timer expires.

10. The one or more computer-readable media of claim 6 wherein the computer environment has at least one system area network.

* * * * *